United States Patent [19]
Meroni

[11] 4,148,088
[45] Apr. 3, 1979

[54] ELECTRONIC CIRCUIT BREAKER

[75] Inventor: Umberto Meroni, Novate Milanese, Italy

[73] Assignee: Societa Italiana Telecomunicazioni Siemens S.p.A., Milan, Italy

[21] Appl. No.: 813,213

[22] Filed: Jul. 6, 1977

[30] Foreign Application Priority Data

Jul. 7, 1976 [IT] Italy .................... 25078 A/76

[51] Int. Cl.² ............................................. H02H 3/08
[52] U.S. Cl. ........................................ 361/93; 323/9;
361/101; 363/50; 363/55
[58] Field of Search ................. 361/93, 94, 98, 101,
361/88, 89; 363/50, 55, 56, 57, 58; 323/9, 22 T;
307/43, 52, 58, 85, 86; 325/185, 186

[56] References Cited
U.S. PATENT DOCUMENTS

| | | | |
|---|---|---|---|
| 3,386,005 | 5/1968 | Roland et al. | 363/50 X |
| 3,571,662 | 3/1971 | Jenson | 361/101 |
| 3,697,857 | 10/1972 | El-Banna | 363/50 X |
| 3,729,671 | 4/1973 | Jeffery et al. | 363/50 |

Primary Examiner—Patrick R. Salce
Attorney, Agent, or Firm—Karl F. Ross

[57] ABSTRACT

An electronic circuit breaker feeding a d-c/d-c converter from a power supply common to several such converters includes a normally saturated main or switching transistor $T_1$ in series with the associated converter, the latter having an output from which auxiliary voltage is fed back to an ancillary transistor $T_2$ lying in series with a voltage divider $R_1$, $R_2$ serving to bias the main transistor into conduction. A further transistor $T_3$ triggers the cutoff of the main transistor $T_1$ when the converter draws excess current, part of which flows through the voltage divider $R_1$, $R_2$. Another voltage divider $R_4$, $R_5$ in parallel with the first-mentioned divider biases the further transistor $T_3$ and is thus traversed by a portion of the feedback current passing through the ancillary transistor $T_2$, being therefore likewise cut off upon de-energization of the converter by the cessation of conduction through the main transistor. Restoration of normal conditions is possible by the temporary opening of a switch in series with the converter input whereby a capacitor $C_1$ connected across the output of the ancillary transistor $T_2$ is discharged so that reclosure of the switch starts a current flow through the two voltage dividers; a shunt capacitor $C_2$ connected across the input of the trigger transistor $T_3$ delays its conduction so that the switching transistor $T_1$ again saturates as the converter is re-energized.

9 Claims, 2 Drawing Figures

ELECTRONIC CIRCUIT BREAKER

FIELD OF THE INVENTION

My present invention relates to an electronic circuit breaker for power systems employing d-c/d-c converters adapted to supply electronic equipment.

BACKGROUND OF THE INVENTION

Power sources designed to energize electronic loads generally comprise a feed stage adapted to supply a constant voltage of predetermined magnitude, by way of a distribution or bus bar, to a plurality of d-c/d-c converters connected in parallel to one another.

Each converter transforms its input voltage into a plurality of output-voltage levels as required for the energization of various load circuits connected to the converter.

In conventional converters, any short circuit occurring downstream of the converter in any of its outputs lowers the available supply voltage, thereby reducing the energization of the remaining load connected to it.

To eliminate this disadvantage, a circuit breaker is usually inserted upstream of each converter so that when a short circuit occurs in one of the load circuits, the circuit breaker disconnects the converter feeding the circuit affected by the short circuit, thereby avoiding a drop in the supply voltage. The known solutions involve the use of conventional circuit breakers of electro-mechanical type which require frequent maintenance operations.

OBJECT OF THE INVENTION

The object of the present invention is to provide an electronic circuit breaker which is adapted to disconnect the converters when abnormal conditions arise and whose operation is easily restored by making use of a particularly simple and economic circuit arrangement.

SUMMARY OF THE INVENTION

I realize this object, in accordance with the present invention, by providing each converter with an electronic circuit breaker including a normally saturated switching transistor in series with the converter input, this transistor being maintained conductive by a feedback voltage from one of the converter outputs. Upon the occurrence of an overload downstream of the converter, the latter draws excess current from the biasing circuit of the switching transistor whereby this transistor is desaturated and eventually cut off. Since that cutoff de-energizes the converter, the feedback voltage disappears and the circuit breaker is not automatically restored to normal even upon the termination of the overload or short circuit. Such restoration, however, is possible by a short-term interruption of the power supply with the aid of a control key or switch in series with the converter input whereby a capacitive charge in the biasing circuit is dissipated and the reclosure of the control key causes a current flow through which the switching transistor is again turned on.

According to a more particular feature of my invention, the biasing circuit includes a voltage divider with a tap connected to the base of the switching transistor, this voltage divider lying in series with an ancillary transistor whose emitter receives the feedback voltage from the converter and which is thus traversed by the feedback current. A portion of another voltage divider, connected in parallel with the aforementioned divider, is shunted by the switching transistor and upon desaturation of that transistor biases a trigger transistor into conduction, that trigger transistor bringing about a rapid switchover to the alternate state of the circuit breaker in which the converter is open-circuited. A storage capacitor connected across the output of the ancillary transistor, i.e. between the base and the collector thereof, charges under these circumstances through the two voltage dividers to the supply voltage; the removal of this supply voltage by the temporary reversal of the control key lets the capacitor discharge so that reclosure of the key establishes a voltage drop across the voltage dividers. A second capacitor, however, shunts a resistor of the second voltage divider and forms with it an RC network connected across the base and emitter of the trigger transistor, the time constant of this network being large enough to let the converter build up the feedback voltage to the level necessary to saturate the main or switching transistor before the trigger transistor can become sufficiently conductive to prevent such saturation.

BRIEF DESCRIPTION OF THE DRAWING

The above and other features of my invention will now be described in detail with reference to the accompanying drawing in which.

SPECIFIC DESCRIPTION

Figure 1:
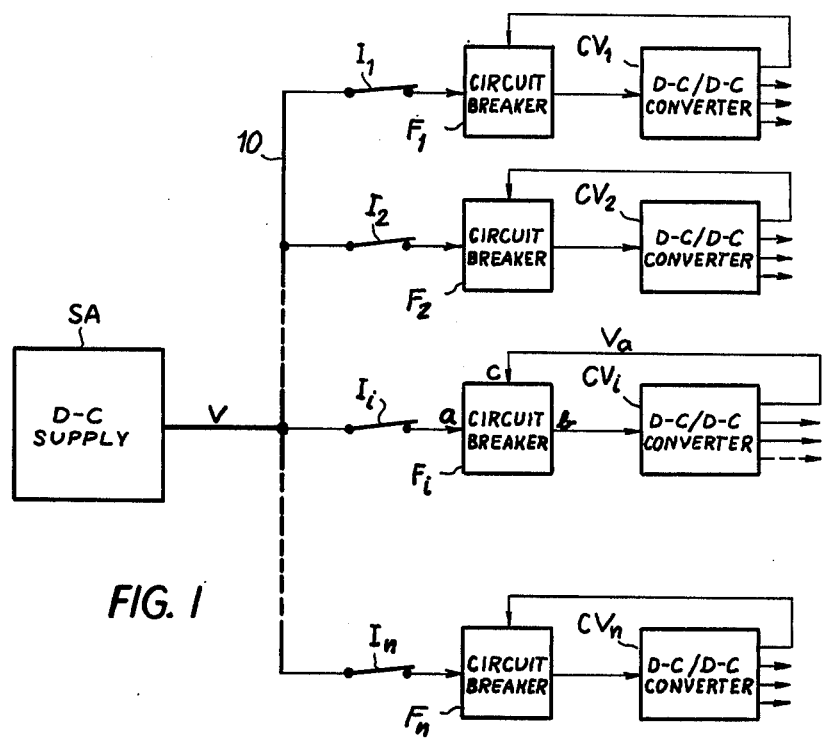
FIG. 1 is a block diagram of a power source utilizing an electronic circuit breaker according to the invention.

FIG. 1 shows a power source SA which generates a direct voltage V having a predetermined magnitude.

The voltage V is supplied by way of a distribution or bus bar 10 and normally closed control keys $I_1$, $I_2$, ... $I_n$ to n d-c/d-c converters $CV_1$, $CV_2$, ..., $CV_n$ downstream of which there are connected respective circuit breakers $F_1$, $F_2$, ..., $F_n$. A given circuit breaker $CV_i$ receives the supply voltage V on its input a and normally transmits substantially the same voltage on its output b to the associated converter.

A given converter $CV_i$ generates a plurality of voltage levels one of which, which I shall call an auxiliary voltage $V_a$, is fed back to control the operation of the corresponding circuit breaker $F_i$ (via input c) as more fully described hereinafter.

A given control key $I_i$ normally connects the converter to the bus bar 10 and is also used for restoring the electrical continuity of the circuit breaker $F_i$ with which it is associated, after converter $CV_i$ has been deactivated in response to an overload condition in one of its outputs.

Figure 2:
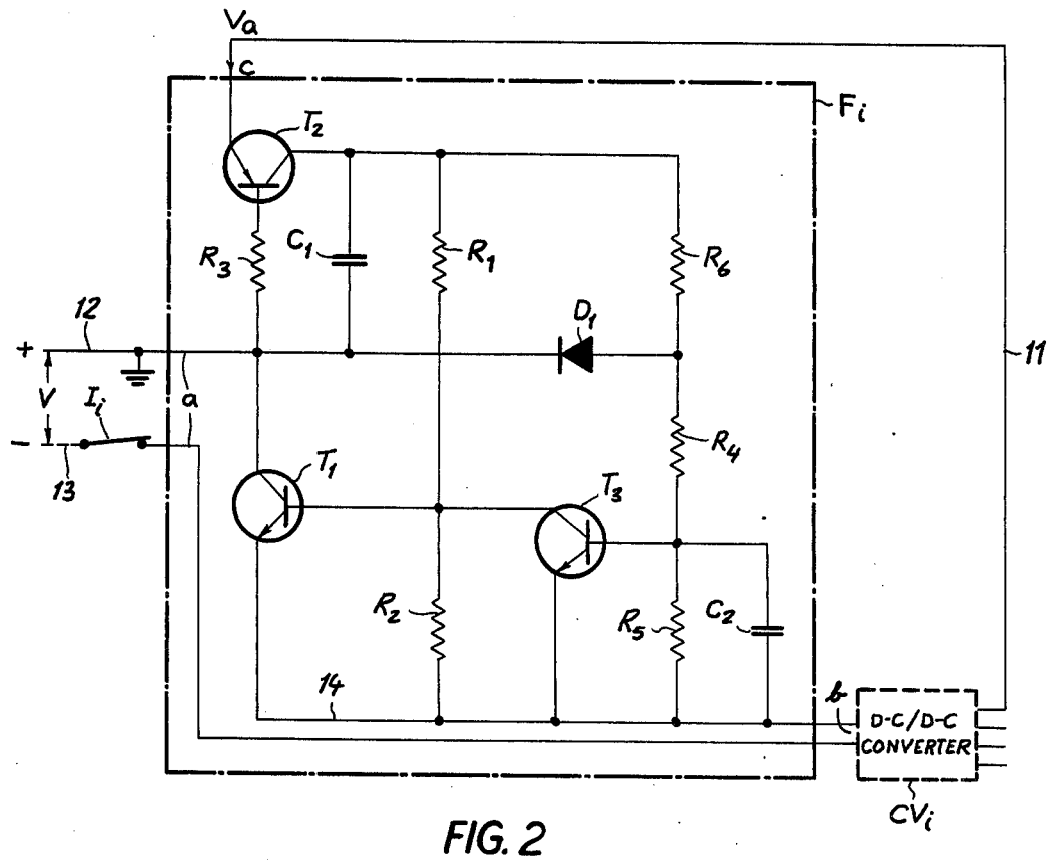
FIG. 2 illustrates in more detail the circuit breaker of FIG. 1.

As shown in FIG. 2a, main or switching transistor $T_1$ within circuit breaker $F_i$ has the function, in its cut-off condition, of open-circuiting the input of converter $CV_i$.

The collector of the transistor $T_1$ is connected (at input a) to the positive terminal of voltage source SA (FIG. 1) via a lead 12 of a branch line 12, 13 of bus bar 10 whereas its emitter is connected via a lead 14 to the input of converter $CV_i$ and thus to the negative source terminal via lead 13 of that branch line containing the corresponding control key $I_i$.

The base of the NPN transistor $T_1$ is biased by a first voltage divider formed by resistors $R_1$ and $R_2$, resistor $R_2$ being connected between the base and the emitter of that transistor.

The transistor $T_1$ is controlled by a second transistor $T_2$ of PNP type whose collector is connected to the resistor $R_1$. The emitter of the ancillary transistor $T_2$ is connected (at input c) to a feedback lead 11 of converter $CV_i$ carrying the auxiliary voltage $V_a$; its base is connected to the grounded input lead 12 by way of a resistor $R_3$.

The collector of transistor $T_2$ is connected to the lead 12 through a capacitor $C_1$.

The base of the transistor $T_1$ is also connected to the collector of a third or trigger transistor $T_3$, also of NPN type, whose base is biased by a second voltage divider comprising resistors $R_4$, $R_5$ and $R_6$ connected between lead 14 and the collector of the transistor $T_2$ in parallel with divider $R_1$, $R_2$. A capacitor $C_2$ shunts the resistor $R_5$; the junction of resistors $R_5$ and $R_6$ is connected to grounded lead 12 and thus to the collector of the transistor $T_1$ by way of a diode $D_1$.

The operation of the circuit arrangement described above can be explained by considering the operational condition in which the transistors $T_1$ and $T_2$ are conducting.

As long as the transistor $T_1$ is conducting, the converter $CV_i$ is energized and an auxiliary positive voltage $V_a$ is available at its output 11. Current then flows through the resistors $R_1$ and $R_2$ via the emitter-collector path of transistor $T_2$, thereby saturating the transistor $T_1$.

The transistor $T_3$ is, however, cut off as virtually no current flows through the resistors $R_4$ and $R_5$ which are short-circuited by diode $D_1$ in series with transistor $T_1$.

These conditions remain in effect as long as the current drawn by the converter $CV_i$ is kept below a predetermined level.

When the current drawn by the converter $CV_i$, owing to an overload in an output circuit thereof, on the user circuit, exceeds such predetermined level, transistor $T_2$ begins to desaturate; therefore the voltage divider $R_1$, $R_2$ can no longer supply the necessary base current to the transistor $T_1$ which is thereby also desaturated. This causes a small current to flow via resistor $R_6$ through the resistors $R_4$ and $R_5$, which results in the starting of a regenerative process ending with the saturation of the transistor $T_3$ and a cutoff of the transistor $T_1$.

The end of conduction of the transistor $T_1$ open-circuits the converter $CV_i$ and thus the auxiliary voltage $V_a$ fed back on lead 11 disappears, which results in the cutoff of the transistor $T_2$ and then of the transistor $T_3$. Capacitor $C_1$ is thus charged negative from the lead 14 which is connected through the converter to the negative input lead 13.

Conduction of the transistor $T_1$ can be restored by briefly opening the control key $I_i$ whereby the negative potential is removed from lead 14, allowing capacitor $C_1$ to discharge via the reverse resistance of diode $D_1$ and the collector/base resistance of transistor $T_2$ whereby, upon reclosure of key $I_i$, a current flows through the resistors $R_1$ and $R_2$ and causes the transistor $T_1$ to conduct again.

The transistor $T_3$ however, remains cut off as the capacitor $C_2$ delays its conduction for a time interval, determined by the time constant $\tau = R_5 \cdot C_2$ longer than the time interval required for the output of the converter $CV_i$ to reach the requisite magnitude of auxiliary voltage $V_a$. This voltage $V_a$ then turns on the transistor $T_2$ and thus the transistor $T_1$ is again saturated.

In these conditions, the transistor $T_3$ is prevented from conducting as the current trasversing the resistor $R_6$ flows virtually exclusively through the diode $D_1$ and the transistor $T_1$.

It will be noted that the diode $D_1$ is connected with such polarity as to provide heat compensation for the base-emitter junction of the transistor $T_3$ besides facilitating the flow of saturation current through transistor $T_1$.

I claim:

1. In a power-supply system for the supply of direct current to a plurality of loads, in combination:

a source of direct current;

a plurality of d-c/d-c converters with input circuits connected in parallel to said source and with output circuits feeding said loads;

a plurality of electronic circuit breakers each inserted between said source and a respective one of said converters; and a control switch individual to each converter upstream of the respective circuit breaker;

each of said circuit breakers including a switching transistor in series with the input circuit of the associated converter, biasing means for said switching transistor, a feedback connection extending from the output circuit of the associated converter to said biasing means for normally maintaining said switching transistor saturated, trigger means connected to said biasing means and sensitive to an excess current flow in said input circuit for cutting off said switching transistor and open-circuiting the associated converter, and a storage capacitor connected to said biasing means for facilitating a restoration of conductivity of said switching transistor upon a temporary opening of said control switch.

2. The combination defined in claim 1 wherein said biasing means comprises an ancillary transistor and a first voltage divider lying in series with each other between said feedback connection and said input circuit whereby current drawn by said converter passes in part through said first voltage divider, said switching transistor having a base tied to a tap on said first voltage divider, said trigger means including a further transistor shunting part of said first voltage divider and a second voltage divider in parallel with said first voltage divider, said further transistor having a base tied to a tap on said second voltage divider.

3. The combination defined in claim 2 wherein said input circuit includes a first input lead connected to said source and a second input lead connected to said first and second voltage dividers, said switching transistor and said further transistor each having an emitter tied to said second input lead.

4. The combination defined in claim 3 wherein said control switch is inserted in said first input lead.

5. The combination defined in claim 4 wherein said source has a first terminal connected to said first input lead and a second terminal connected to an additional lead, said switching transistor having a collector tied to said additional lead, said ancillary transistor having a base connected through a resistor to said additional lead.

6. The combination defined in claim 5 wherein said storage capacitor is connected between said additional lead and an output electrode of said ancillary transistor which is also connected to said first and second voltage dividers.

7. The combination defined in claim 6, further comprising a second capacitor connected between the base and the emitter of said further transistor in parallel with a portion of said second voltage divider defining with said second capacitor a time-constant network delaying conduction of said further transistor upon reclosure of said control switch.

8. The combination defined in claim 6 wherein said ancillary transistor is of a conductivity type opposite that of said switching transistor, said output electrode being a collector.

9. The combination defined in claim 6, further comprising a diode inserted between an intermediate point of said second voltage divider and said additional lead with a polarity facilitating the flow of saturating current through said switching transistor.

* * * * *